United States Patent Office 3,136,289
Patented June 9, 1964

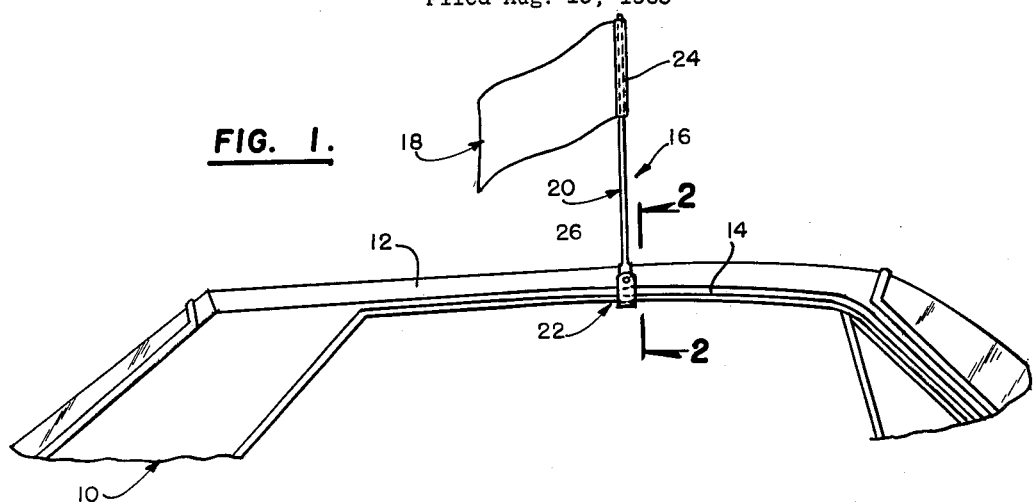
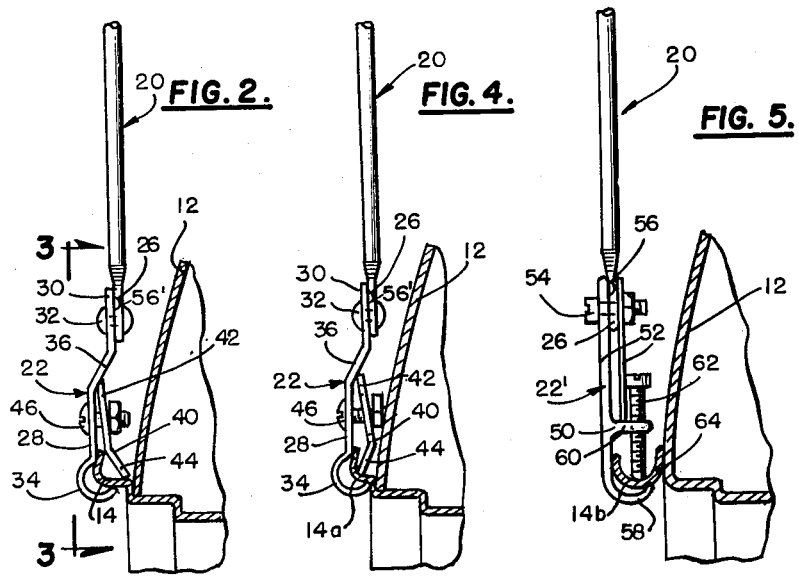
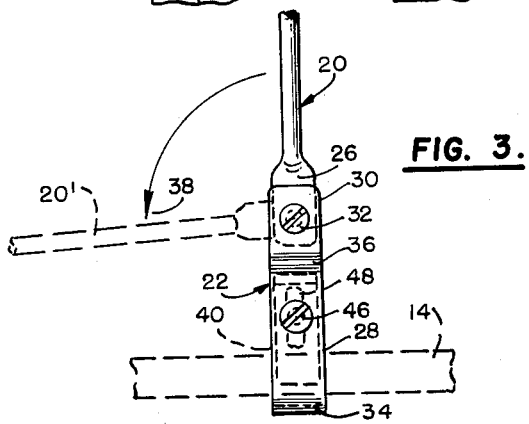
INVENTOR.
Edward E. Johnson
BY
ATTORNEYS

3,136,289
VEHICLE SIGNAL DEVICE
Edward E. Johnson, 1738 W. 2nd St., Hastings, Nebr.
Filed Aug. 19, 1963, Ser. No. 303,026
7 Claims. (Cl. 116—28)

This invention relates to a vehicle signal device and more particularly to a device which may be easily secured to a portion of a vehicle and includes a readily discernible signal means which extends above the roof of the vehicle when the device is in an operative position to facilitate identifying the vehicle when the same is parked in a crowded area or when one vehicle is attempting to follow another through heavy traffic.

As conducive to a better understanding of the instant invention, it is common experience to find great difficulty in locating a particular vehicle when the same is parked among a large number of other vehicles, such as in a crowded parking lot or the like. Also, difficulty is encountered in maintaining visual contact with a vehicle being followed through heavy traffic because of the interposition of other vehicles in the line of sight.

It is a primary object of the instant invention to provide a device which overcomes the foregoing and other problems.

Another object of the instant invention is the provision of a signal device for a vehicle which is simple and inexpensive to manufacture, reliable and efficient in operation, and sturdy and durable in use.

Yet another object of this invention is to provide such a signal device which may be readily secured to the rain gutter of a vehicle with a flag means or the like extending above the roof of the vehicle when the device is moved to an operative position.

A still further object of this invention is to provide a signal device which will automatically move to an inoperative position with the signal means thereof resting in the vehicle rain gutter when the vehicle is moving.

Another object of this invention is to provide a vehicle signal device having clamping means which will readily accommodate both wide and narrow rain gutters.

Other and further objects reside in the combinations of elements, arrangements of parts, and features of construction.

Still other objects will in part be obvious and in part be pointed out as the description of the invention proceeds and as shown in the accompanying drawing wherein:

FIGURE 1 is a fragmentary side elevational view of a vehicle having a signal device in accordance with the instant invention secured to the rain gutter thereof;

FIGURE 2 is an enlarged fragmentary cross-sectional view taken substantially on line 2—2 of FIGURE 1 showing a preferred embodiment of the device of the instant invention engaged in a relatively wide rain gutter;

FIGURE 3 is a fragmentary side elevational view taken substantially on line 3—3 of FIGURE 2 showing the rain gutter in dotted lines and showing the inoperative position of the staff means in dotted lines;

FIGURE 4 is a view similar to FIGURE 2 showing rearrangement of the components of the clamping means of the signal device of the instant invention for accommodation of a relatively narrow rain gutter; and FIGURE 5 is a view similar to FIGURES 2 and 4 of a modified embodiment of clamping means for the signal device of the instant invention.

Similar reference characters refer to similar parts throughout the several views of the drawing.

Referring now to the drawing in general and more particularly to FIGURES 1 to 4, the upper portion of a conventional automobile or other such vehicle is designated generally by the reference numeral 10 and includes a roof 12 and a rain gutter 14 extending longitudinally alongside the roof 12, it being understood that a similar rain gutter extends longitudinally on the opposite side of the roof 12.

A preferred embodiment of the signal device of the instant invention is designated generally by the reference numeral 16 and comprises basically a signal means 18, a staff means 20, and a clamping means 22.

The signal means 18 may take any readily identifiable form such as a flag or pennant, preferably of a bright color so as to be easily distinguished from a distance. The staff means 20 may take any conventional form and as shown is an elongated rod having an upper end 24 to which the signal means 18 is secured in an obvious manner, and a lower end 26 of diminished cross-section to which the clamping means 22 is secured as will be set forth in greater detail hereinafter.

The preferred embodiment of clamping means 22 will be seen in FIGURES 2 to 4 to consist of a first member 28 having an upper portion 30 which is preferably pivotally secured to the lower end 26 of the staff means 20 as by a rivet 32 or the like. The first member 28 has a lower portion 34 adapted to engage beneath the rain gutter 14 and preferably includes an offset intermediate portion 36 to vertically align the staff means 20 with the rain gutter 14 so that the upper end 24 thereof and the signal means 18 will rest in the rain gutter 14 when the device is moved to an inoperative position as will be explained in further detail hereinafter. The rivet 32 forms a pivot means which frictionally engages the clamping means 22 and the staff means 20 whereby the staff means will remain in the operative or vertically extending position shown in FIGURE 1 until an external force moves the same in the direction shown by the arrow 38 in FIGURE 3 to the inoperative position 20' where it extends substantially horizontally with the flag means 18 and upper end 24 of the staff means 20 resting in the rain gutter 14. Preferably, the frictional engagement of the pivot means 32 is such that it is overcome by the atmospheric drag created when the vehicle 10 is moving so that the staff means 20 will automatically be moved to the inoperative position 20' in the event that the operator forgets to lower the same. The clamping means 22 further includes a second member 40 having an upper portion in the form of a long arm member 42 and a lower portion in the form of a short arm member 44, the upper portion 42 being removably secured to the first member by tightening means 46 in the form of a nut and bolt, and the lower portion 44 engaging interiorly of the rain gutter to provide a clamping action. The upper and lower portions 42 and 44, respectively, of the second member 40 are preferably disposed at an angle of between 135 and 180° with respect to each other and the upper portion 42 includes means defining a longitudinally extending slot 48 so that the second member 40 may be reversed as shown particularly in FIGURE 4 to clampingly engage a relatively narrow rain gutter 14a.

A modified embodiment of signal device in accordance with the instant inventive concept is shown in FIGURE 5, it being understood that the staff means and signal means are the same as the embodiment of FIGURES 1 to 4, only the clamping means designated generally 22' being changed. Also, in FIGURE 5 an alternate form of rain gutter 14b is shown as secured to the roof 12 of the vehicle. The clamping means 22' includes an elongated member 50 with a bifurcated upper end portion 52 to receive therebetween the lower end 26 of the staff means 20, an adjustable tightening means 54 in the form of a nut and bolt pivotally securing these elements to each other. A stop means 56 may be secured to a portion of the elongated member 50 to limit the movement of the staff means 20 about the pivot means 54 to one direction with respect to the vertically extending operative position. It is to be understood that such a stop means may be readily incorporated into the embodiment of FIGURES 1 to 4 as seen at 56'. Similarly, an adjustable tightening means such as the nut and bolt 54 may be used in place of the rivet 32 of the embodiment of FIGURES 1–4. The elongated member 50 has a lower portion 58 adapted to engage beneath the rain gutter 14b and a transverse flange portion 60 intermediate the upper and lower ends thereof extending over the rain gutter 14b to threadably receive a screw means 62 of such a length to adjustably and clampingly engage the interior of the rain gutter 14b at 64. It is to be understood that the screw means 62 may be offset with respect to the pivot means 54 to facilitate engaging the screw head with a screwdriver or the like.

The use and operation of the device of the instant invention will now be apparent. The clamping means 22 or 22' or other comparable clamping means may be secured to the rain gutter of a vehicle as explained hereinabove. When parking in a crowded area the staff means 20 and signal means 18 may be moved to the operative position by pivoting the staff means 20 about the pivot means 32 or 54 to a substantially vertically extending position either in contact with a stop means, such as 56 or maintained in place by the frictional engagement of the pivot means. The signal means 18 will serve to quickly identify the automobile from a distance. In the event that the operator fails to lower the device, it will automatically move to the inoperative position as soon as the vehicle reaches sufficient speed for the atmospheric drag to overcome the frictional engagement of the pivot means and the upper portion of the staff means 20 having the signal means 18 secured thereto will rest within the rain gutter when not in use.

In order to utilize the signal device of the instant invention with the vehicle moving, such as when one vehicle is attempting to follow another vehicle in traffic, the clamping means 22 or 22' are disengaged from the rain gutter on one side of the vehicle and re-engaged with the rain gutter on the opposite side of the vehicle so that a stop means such as 56 will not permit the atmospheric drag to lower the staff means 20 during movement of the vehicle.

It will now be seen that there is herein provided an improved vehicle signal device which satisfies all the objectives of the instant invention and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A signal device for a vehicle comprising signal means, staff means having an upper and a lower end, said signal means being secured to said upper end of said staff means, and clamping means secured to said lower end of said staff means and adapted to removably engage a portion of the vehicle so that said signal means extends above the roof of the vehicle when said device is in an operative position, the roof of the vehicle including a longitudinally extending rain gutter on each side thereof, and said clamping means being adapted to engage either of said rain gutters, pivot means being provided foldably securing said lower end of said staff means to said clamping means so that said staff means may be moved between a substantially vertically extending operative position and a substantially horizontally extending inoperative position, and stop means being provided to limit the movement of said staff means about said pivot means to one direction with respect to said vertically extending operative position.

2. A signal device for a vehicle comprising signal means, staff means having an upper and a lower end, said signal means being secured to said upper end of said staff means, and clamping means secured to said lower end of said staff means and adapted to removably engage a portion of the vehicle so that said signal means extends above the roof of the vehicle when said device is in an operative position, the roof of the vehicle including a longitudinally extending rain gutter on each side thereof, and said clamping means being adapted to engage either of said rain gutters, pivot means being provided foldably securing said lower end of said staff means to said clamping means so that said staff means may be moved between a substantially vertically extending operative position and a substantially horizontally extending inoperative position, said pivot means frictionally engaging said lower end of said staff means and said clamping means, whereby said staff means will remain in said operative position until an external force moves the same to said inoperative position.

3. A structure in accordance with claim 2 wherein the frictional engagement of said pivot means is overcome by atmospheric drag when said vehicle is moving, whereby said staff means will automatically be moved to said inoperative position.

4. A signal device for a vehicle comprising signal means, staff means having an upper and a lower end, said signal means being secured to said upper end of said staff means, and clamping means secured to said lower end of said staff means and adapted to removably engage a portion of the vehicle so that said signal means extends above the roof of the vehicle when said device is in an operative position, the roof of the vehicle including a longitudinally extending rain gutter on each side thereof, and said clamping means being adapted to engage either of said rain gutters, said clamping means including a first member having an upper portion secured to said lower end of said staff means, and a lower portion adapted to engage beneath said rain gutter, and a second member having an upper portion removably secured to said first member intermediate said upper and lower portions of said first member, and a lower portion engaging interiorly of said rain gutter, and tightening means for removably securing said second member to said first member.

5. A structure in accordance with claim 4 wherein said upper portion of said second member is a long arm member and said lower portion of said second member is a short arm member, said long and short arm members being disposed at an angle greater than 135° and less than 180°.

6. A structure in accordance with claim 5 wherein said long arm member includes means defining a longitudinally extending slot therethrough for adjustably receiving said tightening means.

7. A signal device for a vehicle comprising signal means, staff means having an upper and a lower end, said signal means being secured to said upper end of said staff means, and clamping means secured to said lower end of said staff means and adapted to removably engage a portion of the vehicle so that said signal means extends above the roof of the vehicle when said device is in an operative position, the roof of the vehicle including a longitudinally extending rain gutter on each side thereof, and said clamping means being adapted to engage either of said rain gutters, pivot means being provided foldably securing said lower end of said staff means to said clamping means so that said staff means may be moved between a substantially vertically extending operative position and a substantially horizontally extending inoperative position, said staff means being offset toward the roof of the vehicle with respect to said clamping means so that the upper portion of said staff means and said signal means may rest in said rain gutter when said staff means has been moved to said inoperative position.

References Cited in the file of this patent

UNITED STATES PATENTS

| | | |
|---|---|---|
| 579,735 | Bower | March 30, 1897 |
| 1,162,608 | Hohl et al. | Nov. 30, 1915 |
| 1,928,563 | Hetzel | Sept. 26, 1933 |
| 2,288,442 | Felton | June 30, 1942 |
| 2,527,357 | Donahey | Oct. 24, 1950 |
| 2,548,068 | Roundtree et al. | Apr. 10, 1951 |
| 2,603,394 | Beck | July 15, 1952 |
| 2,634,928 | Hawes | Apr. 14, 1953 |
| 2,680,588 | Wright | June 8, 1954 |
| 2,718,370 | Carrier | Sept. 20, 1955 |
| 2,764,122 | Irvin | Sept. 25, 1956 |
| 2,818,830 | Kester | Jan. 7, 1958 |
| 2,920,855 | Giebel | Jan. 12, 1960 |
| 3,001,309 | Schaefers | Sept. 26, 1961 |